(12) United States Patent
Kawazoe

(10) Patent No.: US 8,781,501 B2
(45) Date of Patent: Jul. 15, 2014

(54) INFORMATION SHARING SYSTEM USING MAPS

(71) Applicant: Oceans Inc., Tokyo (JP)

(72) Inventor: Takayuki Kawazoe, Tokyo (JP)

(73) Assignee: Oceans Inc., Tokyo (JP)

( * ) Notice: Subject to any disclaimer, the term of this patent is extended or adjusted under 35 U.S.C. 154(b) by 0 days.

(21) Appl. No.: 14/017,643

(22) Filed: Sep. 4, 2013

(65) Prior Publication Data

US 2014/0141811 A1    May 22, 2014

(30) Foreign Application Priority Data

Nov. 21, 2012 (JP) .................................. 2012-255096

(51) Int. Cl.
*H04W 4/02* (2009.01)
(52) U.S. Cl.
USPC ..................... 455/456.3; 455/414.1
(58) Field of Classification Search
CPC ... H04M 1/72572; G09B 29/00; G09B 21/00; G01C 21/36; G08G 1/00; H04W 4/00; H04W 4/021; H04W 4/02; H04W 64/006; H04W 4/043; G06Q 30/0601; G06Q 30/0251
USPC ............. 455/414.1–414.3, 456.1–456.6, 457
See application file for complete search history.

(56) References Cited

U.S. PATENT DOCUMENTS

| | | | |
|---|---|---|---|
| 6,662,016 B1 * | 12/2003 | Buckham et al. ............. | 455/457 |
| 2006/0064346 A1 * | 3/2006 | Steenstra et al. ................ | 705/14 |
| 2007/0219708 A1 * | 9/2007 | Brasche et al. ............... | 701/207 |

FOREIGN PATENT DOCUMENTS

| | | | |
|---|---|---|---|
| JP | 11-272698 | 10/1999 | |
| JP | 2002-271839 | 9/2002 | |
| JP | 2003-141682 | 5/2003 | |
| JP | 2004-126653 | 4/2004 | |
| JP | 2004126653 | * 4/2004 | ............. G06F 13/00 |
| JP | 2005-61966 | 3/2005 | |
| JP | 2008-033755 | 2/2008 | |
| JP | 2010-512059 | 4/2010 | |
| JP | 2012-075143 | 4/2012 | |

(Continued)

OTHER PUBLICATIONS

Asahi Interactive, Inc., "Renewal of Your neighborhood chat app Eyeland not coupled with social media," CNET Japan, May 23, 2012, [Searched on Feb. 7, 2013], http://japan.cnet.com/news/service/35017326/.

(Continued)

*Primary Examiner* — George Eng
*Assistant Examiner* — Jing Gao
(74) *Attorney, Agent, or Firm* — Greenblum & Bernstein, P.L.C.

(57) ABSTRACT

System capable of giving a sense of unity or solidarity to a plurality of users sharing information is provided. Each of a plurality of client terminals includes a position information acquiring means. A management server updates user position information stored in a user database based on present position information of the respective client terminals. The management server reads a plurality of items of user position information contained in a predetermined range and a plurality of items of user information associated with the user position information contained in the predetermined range from the user database on the basis of the predetermined range of the map information read from a map database, and transmits them to the client terminals. The client terminal displays the items of user information at respective positions corresponding to the items of user position information on the map information in the predetermined range received from the management server.

7 Claims, 5 Drawing Sheets

(56) References Cited

FOREIGN PATENT DOCUMENTS

| | | | | |
|---|---|---|---|---|
| JP | 2012-212057 | | 11/2012 | |
| JP | 2012212057 | * | 11/2012 | ............ G09B 29/00 |
| WO | 2006/024003 | | 3/2006 | |
| WO | WO2006024003 | * | 3/2006 | ............... H04Q 7/38 |
| WO | 2008/066960 | | 6/2008 | |
| WO | WO2008066960 | * | 6/2008 | .......... H04M 1/2745 |

OTHER PUBLICATIONS

Japan Office Action (Non-Final Rejection) for corresponding Jp application No. 2012-255096 (JP2012-255096), dated Feb. 12, 2013, together with an English language translation thereof.

Japan Office Action (Final Rejection) for JP2012-255096, dated Apr. 23, 2013, together with an English language translation thereof.

Japan Office Action (Allowance) for JP2012-255096, dated May 14, 2013, together with an English language translation thereof.

* cited by examiner

FIG. 3

USER DATABASE

| No. | ID | AVATAR IMAGE | POSITION INFORMATION | | PASS-WORD | SCALE CONDITION INFORMATION | ATTRIBUTE INFORMATION | | | |
|---|---|---|---|---|---|---|---|---|---|---|
| | | | LAT | LON | | | SEX | AGE | WORK | OTHER KEYWORDS |
| 015 | NSB | NSB.jpg | 139.44 | 135.41 | ****** | 1/1500 OR MORE | MALE | 25 | OFFICE WORKER | BASEBALL, LIBRA |
| 016 | DOM | DOM.jp | 164.42 | 111.46 | ****** | 1/8000 OR MORE | MALE | 21 | STUDENT | GOURMET, SUNDRIES |
| 017 | FTP | FTP.jpg | 135.01 | 116.38 | ****** | 1/15万 OR MORE | FEMALE | 24 | OFFICE WORKER | APPAREL, GOURME, ITALIAN |

FIG. 4

CONTENTS DATABASE

| No. | NAME | ICON IMAGE | POSITION INFORMATION | | SCALE CONDITION INFORMATION | PRIORITY DISPLAY SCORE | DISPLAY PERIOD | | CONTENT | MATCHING KEYWORDS |
|---|---|---|---|---|---|---|---|---|---|---|
| | | | LAT | LON | | | DATE | TIME | | |
| 111 | ITALIAN ○○ | PIN.jpg | 153.96 | 112.35 | 1/8000 OR MORE | 32 | 20121001~20121031 | 18:00~24:00 | http://www.··· 03-0000-0000 | ITALIAN, GOURMET, FOR FEMALES, OFFICE WORKER |
| 112 | JPA FOODxx | PIN.jpg | 157.96 | 135.87 | 1/15万 OR MORE | 65 | 20121001~20121031 | 10:00~14:00 | http://www.··· 03-1111-1111 | JAPANESE FOOD, GOURMET, FOR MALES, STUDENT |
| 113 | TEXT | TEXT.jpg | 135.01 | 116.38 | 1/1500 OR MORE | 40 | | | HELLO | |
| 114 | TRASH BOX | DUST.jpg | 155.97 | 125.63 | 1/1500 OR MORE | 80 | 20120724 | 15:00~24:00 | △△FIREWORKS SHOW TRASH BOX | |

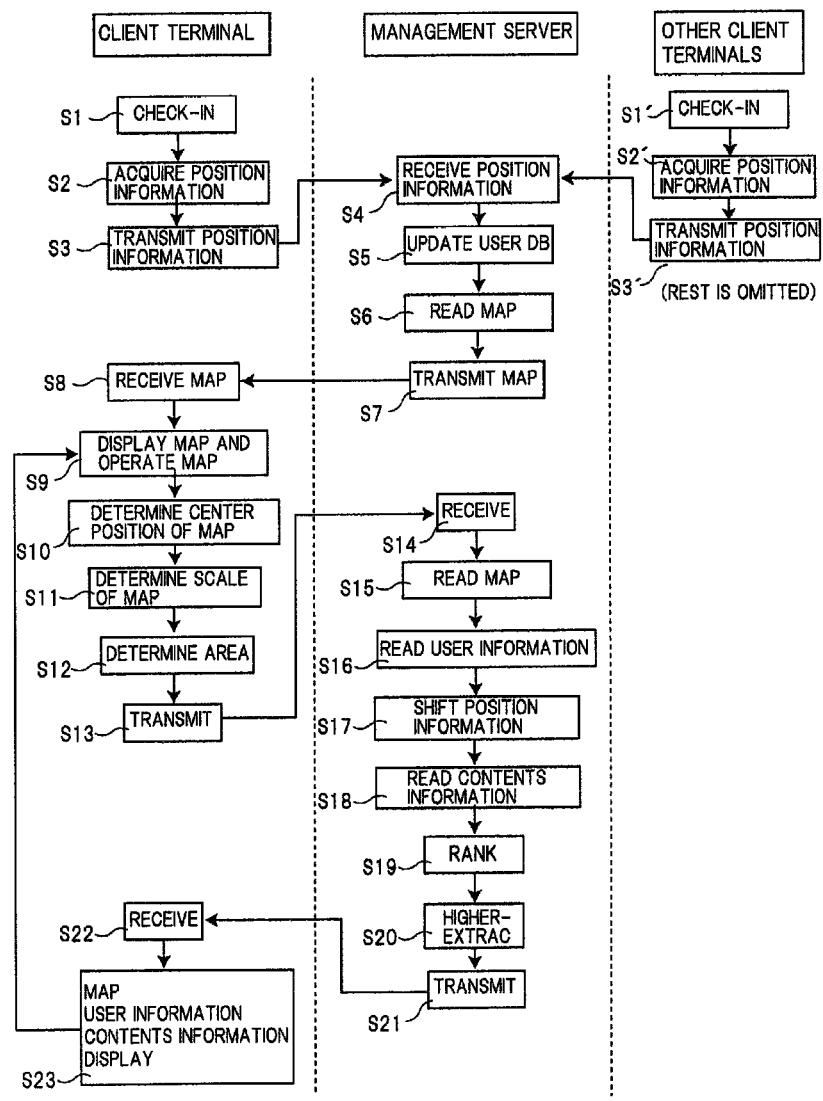

INFORMATION SHARING SYSTEM USING MAPS

TECHNICAL FIELD

The present invention relates to an information sharing system using maps, a program for using the system, a storage medium storing the program therein, and an information sharing method. Specifically, the information sharing systems and the like according to the present invention are directed for providing a new communication platform using position information and maps by displaying maps on user-holding client terminals and displaying information on other users' present positions or shops' advertisements on the map.

BACKGROUND ART

In recent years, position information of personal digital assistants can be easily acquired by use of information received from GPS (Global Positioning System) satellites or information of PHS (Personal Handyphone System) base stations, and various Web services using the position information are widely used.

There is conventionally known a technique for grasping present position information of a user and matching advertisement information or the like to the user by use of a GPS receiving device provided in a personal digital assistant such as cell phone (Patent Literature 1 and Patent Literature 2, for example). In this way, the present position information of the user is grasped thereby to provide the user with advertisement information on restaurants, amusement facilities and various events where the user can easily visit, thereby enhancing potential in the advertisements.

For example, Patent Literature 1 discloses therein a technique for creating a profile reflecting user's hobby or preference, and extracting and displaying, on a wireless terminal, an advertisement matched with user's hobby or preference and user's geographical position from an advertisement database based on the profile and a geographical position of the wireless terminal by use of the portable wireless terminal.

Patent Literature 2 discloses a technique for providing a searching method by which a user can easily narrow necessary image information by use of position information of a portable terminal, time/date information, tags and various weights adapted to a user environment.

CITATION LIST

Patent Literature

Patent Literature 1: Japanese Patent Application Laid-Open No. 2012-75143 Publication
Patent Literature 2: Japanese Patent Application Laid-Open No. 2008-33755 Publication

SUMMARY OF INVENTION

Technical Problem

However, although many users are utilizing Web services, the conventional techniques described in Patent Literatures only provide each of the users with advertisement information, and thus cannot give a sense of unity and solidarity in sharing information among the users.

With the conventional techniques, even if a plurality of users is utilizing the same Web service in a geographically close range, the users cannot know the presence of other users. To the contrary, if mutual information can be shared among the users using the same Web service, a new communication form can be created.

A conventional advertisement matching technique one-sidedly provides a user with advertisement information, and thus the user does not have much option of information. On the other hand, if so many advertisements associated with a certain area are present, the conventional techniques can provide the user with as much advertisement information as the user cannot select, and causes user's troubles.

Therefore, at present, there are desired a system and the like capable of giving a sense of unity and solidarity to a plurality of users sharing information.

Additionally, at present, there are desired a system and the like capable of appropriately matching advertisement information and the like associated with position information to the users.

Solution to Problem

As a result of an eager study of the means for solving the problems of the conventional inventions, the inventors of the present invention have obtained the finding that present position information is acquired from each of a plurality of client terminals and the position information of a client terminal and other client terminals is displayed on a map displayed on a display screen of each client terminal so that mutual position information or information on a certain area can be shared among the users, thereby creating new communication with a sense of unity and solidarity.

The inventors of the present invention have obtained the finding that contents of advertisement information and the like associated with position information are displayed according to a scale of the map displayed on the client terminal, thereby to be appropriately matched with user-desired information.

The present inventors have made the present invention on the assumption of possible solutions to the conventional techniques' problems based on the above findings.

Specifically, the present invention has the following structures.

A first aspect of the present invention is an information sharing system.

The information sharing system according to the present invention is constructed such that a plurality of client terminals 10 and a management server 20 are communicably connected to each other via an information communication line.

At first, each of the client terminals 10 includes: a position information acquiring means 11 for acquiring its present position information; and a client transmitting means 12 capable of transmitting the present position information acquired by the position information acquiring means 11 to the management server 20.

The management server 20 includes: a map database 21 for storing map information with a plurality of scales therein; a user database 22 for storing user information on the users of the client terminals 10 and user position information on a map stored in the map database 21 in an associated manner; a server receiving means 23 capable of receiving the present position information transmitted from the client transmitting means 12; an updating means 24 for updating the user position information stored in the user database 22 based on the present position information received by the server receiving means 23; a map reading means 25 for reading map information in a predetermined range from the map database 21; a user information reading means 26 for reading the user position information contained in a predetermined range and the user information associated with the user position information contained in the predetermined range from the user database 22 based on the predetermined range of the map information read by the map reading means 25; and a server transmitting means 27 capable of transmitting the user position information and the user information read by the user information reading means 26 to the client terminals 10 together with the map information in the predetermined range read by the map reading means 25.

Each of the client terminals 10 further includes: a client receiving means 13 capable of receiving the map information in the predetermined range, the user position information and the user information transmitted from the server transmitting means 27; and a displaying means 14 for displaying the user information at respective positions corresponding to the user position information on the map information in the predetermined range received by the client receiving means 13.

According to the above structure, the present position information acquired by the client terminals 10 is transmitted to the management server 20, and the management server 20 always updates the user position information stored in the user database 22 by the updating means 24. Thus, the items of user position information stored in the user database 22 of the management server 20 are always the latest, and the items of user position information are shared among the client terminals 10 so that the users of the client terminals 10 can know the position information of other users. Thereby, mutual position information or information on an area can be shared among the users. The users can know that other users are present near their present positions, and each user can feel a sense of unity or solidarity in a geographically limited range.

In the information sharing system according to the present invention, each of the client terminals 10 further includes: an operating means 15 capable of changing a scale of the map information displayed on the displaying means 14; and a display scale determining means 16 for determining a scale of the map information displayed on the displaying means 14, and display scale information on the scale of the map information determined by the display scale determining means 16 is preferably transmitted by the client transmitting means 12 and received by the server receiving means 23.

In this case, the management server 20 further includes: a contents database 28 for storing contents information containing images in association with contents position information on a map stored in the map database 21 and scale condition information on a scale of map information required for displaying the contents information; and a contents information reading means 29 for reading the contents information for which the contents position information is contained in a predetermined range of map information and the scale condition information corresponds to the display scale information from the contents database 28 on the basis of the predetermined range of the map information read by the map reading means 25 and the display scale information received by the server receiving means 23, and the contents information read by the contents information reading means 29 is preferably transmitted by the server transmitting means 27 together with the contents position information, and received by the client receiving means 13.

The displaying means 14 of the client terminal 10 preferably displays the images contained in the contents information at respective positions corresponding to the contents position information on the map information in the predetermined range received by the client receiving means 13.

As with the above structure, according to a preferred embodiment of the present invention, not only the position information of the client terminals 10 but also the contents information on restaurants, amusement facilities and various events' advertisements are displayed on the map displayed on the client terminals 10. Thereby, the users of the client terminals 10 can grasp not only a relative position relationship between him/her and the contents information but also a relative position relationship between other users and the contents information. Thus, for example, the user views the map displayed on the display screen thereby to grasp which contents information (such as restaurant) is close to his/her present position at once and to acquire information at which contents information other users are gathering. Therefore, for example, when a plurality of users is gathering at certain contents information, the users viewing the same can be promoted to visit the contents information.

According to the preferred embodiment of the present invention, the contents information is stored in the contents database 28 in association with scale condition information. The scale condition information defines that when the scale of the map displayed on the client terminal 10 is a predetermined value or more (or a predetermined value or less), the contents information is displayed on the display screen of the client terminal 10. That is, according to the preferred embodiment of the present invention, the contents information to be displayed on the map is selected depending on the scale of the map displayed on the client terminal 10. In this way, the contents information is associated with the scale condition information, and thus suitable contents are displayed on the display screen of the client terminal 10 depending on the scale of the map.

In the information sharing system according to the present invention, the user database 22 preferably stores the user information in association with the user position information and the scale condition information on the scale of the map required for displaying the user information.

In this case, the user information reading means 26 preferably reads the user information for which the user position information is contained in a predetermined range of map information and the scale condition information corresponds to the display scale information from the user database 22 on the basis of the predetermined range of the map information read by the map reading means 25 and the display scale information received by the server receiving means 23.

As with the above structure, according to the preferred embodiment of the present invention, the user information to be displayed on the map may be selected depending on the scale of the map displayed on the client terminals 10. For example, the user information on potential users such as users having a high degree of Web service use of the present system or famous users may be displayed on the display screen of the client terminal 10 even when the scale of the map is small (when the display range of the map is wide). On the other hand, for example, the user information on users having a low degree of Web service use of the present system may be displayed on the display screen of the client terminal 10 when the scale of the map is increased (when the display range of the map is narrowed). Thereby, potential users are conspicuously displayed on the map and the system is user-friendly. By doing so, users' interest in the service of the present system can be drawn, which can promote to continuously use the service or give fondness to the service.

A second aspect of the present invention is a computer program for causing the client terminals 10 in the information sharing system according to the first aspect to function as the position information acquiring means 11, the client transmitting means 12, the client receiving means 13 and the displaying means 14.

A third aspect of the present invention is a computer readable information recording medium storing the computer program according to the second aspect therein.

A fourth aspect of the present invention is an information sharing method.

The information sharing method according to the present invention uses a system in which a plurality of client terminals 10 and a management server 20 are communicably connected to each other via an information communication line.

Each of the client terminals 10 performs: a position information acquiring step of acquiring its present position information; and a client transmitting step of transmitting the present position information acquired in the position information acquiring step to the management server 20.

The management server 20 includes: a map database 21 for storing map information with a plurality of scales therein; and a user database 22 for storing user information on the users of the client terminals 10 and user position information on a map stored in the map database 21 in an associated manner.

The management server 20 performs: a server receiving step of receiving the present position information transmitted in the client transmitting step; an updating step of updating the user position information stored in the user database 22 based on the present position information received in the server receiving step; a map reading step of reading map information in a predetermined range from the map database 21; a user information reading step of reading the user position information contained in a predetermined range and the user information associated with the user position information contained in the predetermined range from the user database 22 on the basis of the predetermined range of the map information read in the map reading step; and a server transmitting step of transmitting the user position information and the user information read in the user information step to the client terminals 10 together with the map information in the predetermined range read in the map reading step.

Each of the client terminals 10 further performs: a client receiving step of receiving the map information in the predetermined range, the user position information and the user information transmitted in the server transmitting step; and a displaying step of displaying the user information at respective positions corresponding to the user position information on the map information in the predetermined range received in the client receiving step.

Advantageous Effects of Invention

The system and the like according to the present invention enable a sense of unity and solidarity to be given to a plurality of users sharing information.

The system and the like according to the present invention enable advertisement information and the like associated with its position information to be appropriately matched to users.

BRIEF DESCRIPTION OF DRAWINGS

FIG. 3 conceptually illustrates information stored in a user database.

FIG. 4 conceptually illustrates information stored in a contents database.

FIG. 5 is a flowchart illustrating an information processing flow of a system according to the embodiment of the present invention.

DESCRIPTION OF EMBODIMENT

Forms embodying the present invention will be described below with reference to the drawings. The present invention is not limited to the forms described later, and encompasses their modifications made as needed by those skilled in the art.

Figure 1:
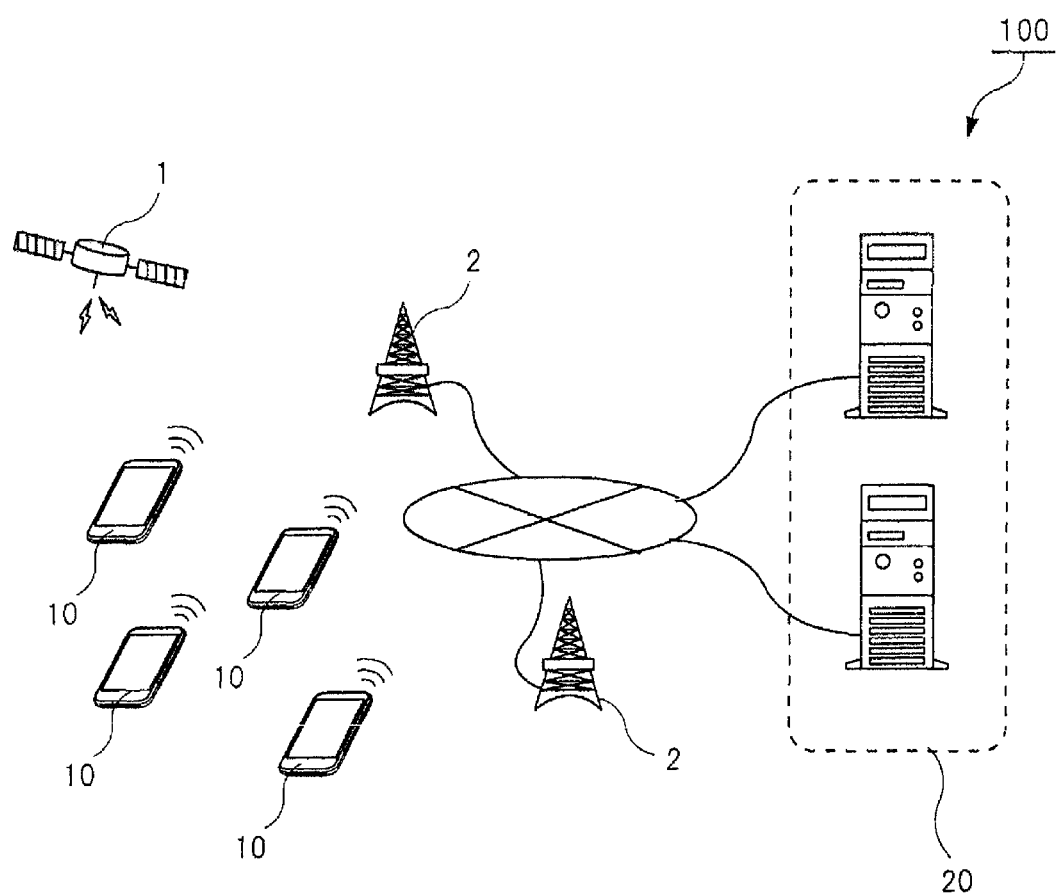
FIG. 1 illustrates a system structure according to an embodiment of the present invention.

FIG. 1 illustrates a structure of an information sharing system 100 according to a preferred embodiment of the present invention. As illustrated in FIG. 1, the information sharing system 100 includes a plurality of client terminals 10 and a management server 20. The client terminals 10 are owned by the users of the services provided by the information sharing system 100. An exemplary client terminal 10 is a cell phone. According to the present invention, the client terminal 10 may be a portable information communication terminal such as tablet terminal, PHS, PDA or notebook type personal computer including a position information acquiring means and including a display device capable of being wirelessly connected to a management server of a service provider and viewing Web pages. The management server 20 is maintained and managed by a service provider running the services. All the functions of the management server 20 do not need to be accomplished by one computer, and the functions may be distributed into a plurality of computers.

In the present invention, each of the client terminals 10 includes the position information acquiring means for acquiring information on its present position. For example, as illustrated in FIG. 1, the client terminal 10 receives its position information (latitude and longitude, and possibly altitude) from a GPS satellite 1 or a base station 2. The position information acquiring means can acquire not only the position information of the client terminal 10 but also information on time/date when it acquires the position information. The client terminal 10 used in the present system may employ a well-known terminal as needed. That is, the client terminal 10 has a hardware structure containing an input/output unit for inputting and outputting information, a storage unit for storing information, a control unit (CPU) for performing control, a calculation unit for making various calculations, and a transmission path such as bus for connecting the respective components. For example, when a main memory of the storage unit is stored with a control application program and is input with predetermined information, the control unit (CPU) reads the application program from the main memory and reads various items of information stored in the storage unit so that predetermined calculations are made in the calculation unit and processed information is output from the output unit while being stored in the storage unit as needed.

The management server 20 may employ all the structures employed in map information providing sites on Internet as needed. The management server 20 stores map information therein, but the map information may be uniquely stored in the management server 20, or may be acquired from an open platform via Internet. The management server 20 may have a structure of a well-known computer as needed. That is, the management server 20 has a hardware structure containing an input/output unit for inputting and outputting information, a storage unit for storing information, a control unit (CPU) for performing control, a calculation unit for making various calculations, and a transmission path such as bus for connecting the respective components. For example, when the main memory of the storage unit is stored with a control program and is input with predetermined information, the control unit (CPU) reads the control program from the main memory and reads various items of information stored in the storage unit so that predetermined calculations are made in the calculation unit and processed information is output from the output unit while being stored in the storage unit as needed.

Figure 2:
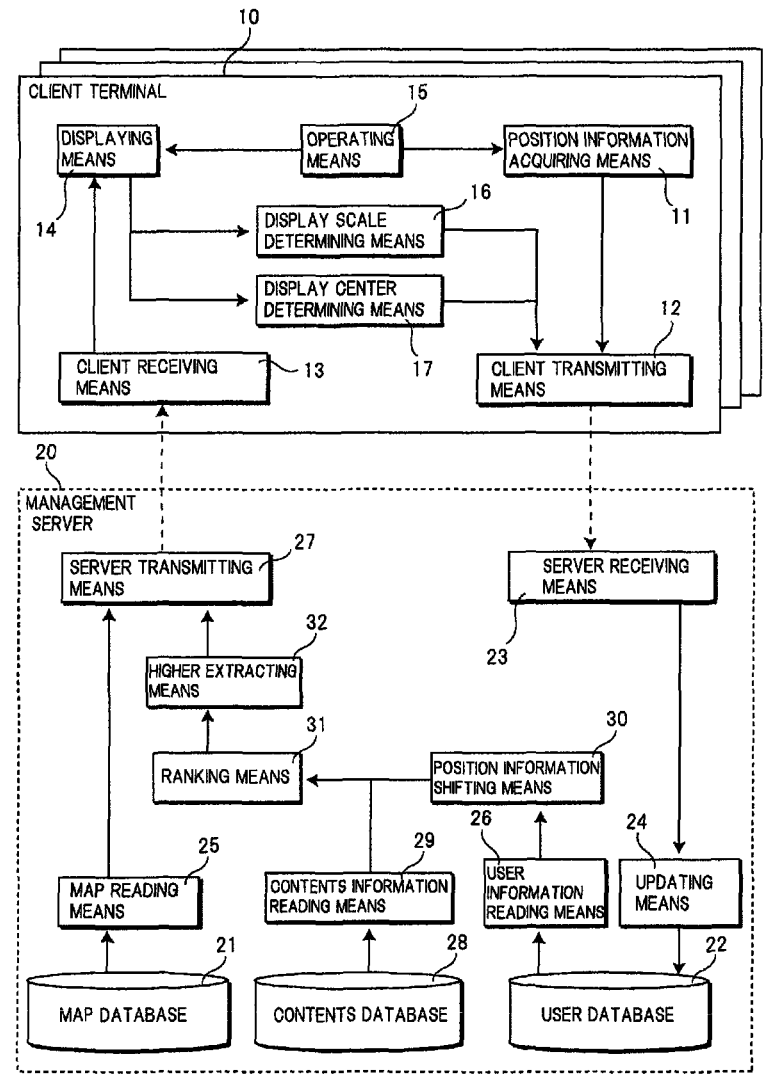
FIG. 2 is a functional block diagram illustrating a structure of the embodiment of the present invention.

FIG. 2 illustrates functional blocks of the information sharing system 100 constructed by the client terminals 10 and the management server 20. The client terminals 10 and the management server 20 constructing the information sharing system 100 cause the control unit to read a program stored in the storage unit, the calculation unit to make predetermined calculations, and various devices to perform various functions according to the read program. That is, the functional means described later are performed in the hardware structures of the client terminals 10 and the management server 20 according to the program.

At first, a functional structure of the client terminal 10 will be described.

As illustrated in FIG. 2, each of the client terminals 10 includes a position information acquiring means 11, a client transmitting means 12, a client receiving means 13, a displaying means 14, an operating means 15, a display scale determining means 16 and a display center determining means 17.

The position information acquiring means 11 is directed for acquiring of present position information of the client terminal 10. The position information acquired by the position information acquiring means 11 contains information on latitude and longitude of the present position of the client terminal 10, for example. The position information may contain information on altitude of the present position of the client terminal 10, or information on reliability of the information. The position information acquiring means 11 is realized by a GPS reception unit and a CPU in the client terminal 10, for example. The GPS reception unit measures a time required for receiving a respective radio wave based on information on radio wave transmission times contained in the radio waves transmitted from a plurality of GPS satellites, and sends temporal information on the time to the CPU. The CPU can calculate information on latitude and longitude of the present position of the client terminal 10 based on the acquired temporal information. The position information may be acquired by the position information acquiring means 11 when each user activates the application program, or at each timing of automatic update at intervals of certain time or manual update, for example.

The client transmitting means 12 is directed for transmitting various items of information from the client terminal 10 to the management server 20. The client receiving means 13 is directed for receiving various items of information transmitted from the management server 20 by the client terminal 10. The client transmitting means 12 and receiving means 13 are realized in a CDMA communication unit or a wireless communication unit, for example. The CDMA communication unit has a function of making wireless communication in the well-known CDMA (Code Division Multiple Access) system. The CDMA communication unit has an antenna for transmitting and receiving carrier waves for wireless communication in the CDMA system, and can perform a map information (map data) reception processing, a processing of transmitting/receiving position information by GPS positioning, a user information transmission/reception processing, a contents information transmission/reception processing, a map request transmission processing, and a processing of transmitting input information input via the operating means, for example. The wireless communication unit has a function of making wireless communication in the wireless LAN (Local Area Network) system. The wireless communication unit has an antenna for transmitting and receiving carrier waves for wireless communication in the wireless LAN system, and can perform a processing of transmitting and receiving various items of information together with the CDMA communication unit or instead of the CDMA communication unit. Thus, if the client terminal 10 has the CDMA communication unit, the wireless communication is dispensable.

The displaying means 14 is directed for displaying map information, user position information and contents information on a user-recognizable display screen. Specifically, the displaying means 14 can display user information at a position corresponding to the present position of each client terminal 10 on a map based on the position information of each client terminal 10. The displaying means 14 can display contents information at a position corresponding to the present position of each content on a map based on the position information of each content. The displaying means 14 can be accomplished by a well-known display. The display is a display device such as LCD (Liquid Crystal Display) or OELD (Organic Electro Luminescence Display). When the user uses the client terminal 10, the display outputs and displays various items of necessary information in response to an input signal from the CPU.

The operating means 15 has a function of receiving a user-input operation and sending the input signal to the CPU. Specifically, the operating means 15 can be input with and receive an operation of changing a scale of the map information displayed by the displaying means 14 or an operation of changing a range of the map information displayed by the displaying means 14. Examples of the operating means 15 are keyboard, mouse and numerical keys. The operating means 15 may configure a touch panel display integral with the displaying means 15. The touch panel display is formed by overlapping a transparent touch screen on the display surface. The touch panel display may employ a well-known display in an electrostatic capacitance system, an electromagnetic induction system, an infrared system, a surface acoustic wave system or a resistive film system.

The display scale determining means 16 is directed for determining a scale of map information displayed by the displaying means 14. As described later, the map information is managed and held by the management server 20, and the map information is configured of map data in a plurality of scales. The display scale determining means 16 can determine in which scale the map information displayed by the displaying means 14 is. The display scale determining means 16 is realized by part of the functions of the CPU, for example. When changing the scale of the map displayed by the displaying means 14 according to the operation information input by the operating means 15, the CPU determines a changed scale, and temporarily stores the information on the determined scale in the storage unit such as memory.

The display center determining means 17 is directed for determining the center of the map displayed by the displaying means 14. The entire map information is difficult to display on the display screen of the client terminal 10, and thus part of the map information is displayed on the display screen. At this time, the display center determining means 17 determines the center of part of the map displayed on the display screen. The display center determining means 17 is always functioning while the map is being opened by the client terminal 10, and acquires latitude and longitude of the center point of the displayed range. Thus, when a display range or scale of the map is changed, the display center determining means 17 acquires latitude and longitude of the center point again in each case. The display center determining means 17 is realized by part of the functions of the CPU, for example. When a scale or range of the map displayed by the displaying means 14 is changed according to the operation information input by the operating means 15, the CPU determines a changed center point of the map, and temporarily stores the information (latitude and longitude) on the determined center of the map in the storage unit such as memory.

The client terminal 10 determines a range of the map to be requested to the management database 20 on the basis of the scale of the map information determined by the display scale determining means 16 and the center of the display range determined by the display center determining means 17. For example, the application program defines therein any places on the map, unique areas having a certain area at a scale, and area IDs thereof, and the client terminal 10 may determine an area based on the scale of the map information and the center of the display range and may request the map information in a range containing the area to the management server 20.

Subsequently, a functional structure of the management server 20 will be described.

As illustrated in FIG. 2, the management server 20 includes a map database 21, a user database 22, a server receiving means 23, an updating means 24, a map reading means 25, a user information reading means 26, a server transmitting means 27, a contents database 28, a contents information reading means 29, a position shifting means 30, a ranking means 31 and a higher extracting means 32.

The map database 21 stores map information with a plurality of scales therein. The map database 2 may employ opened map information in the map information providing sites on Internet as needed. The map information is preferably constructed such that map data on maps of world and maps of Japan in scales of 1/900,000, 1/300,000, 1/150,000, 1/75,000, 1/2,100, 1/8,000, 1/3,000 and 1/1,500 are in a hierarchy. The scale of a map means a rate at which an actual distance is shortened for display on the map, and the notation of 1/M means length on map×M=actual distance. The map information may define the scale per area in the map therein. That is, when a rectangular area is longitudinally and horizontally divided into four, each divided area has the double scale of the non-divided area. The divided area is further divided into 4 longitudinally and horizontally, the scale of each divided area is further doubled. In this way, the map information is configured of divided maps in fine areas, and may define the scale of each area.

The user database 22 is directed for storing user information of the users of the client terminals 10. FIG. 3 illustrates exemplary information stored in the user database 22. The user information is on the users of the services provided by the information sharing system according to the present invention. For example, the user information may contain user identification number (No.), user ID arbitrarily settable by the user, user's avatar image displayed on the screen, password, user attribute information, and other contacts (cell phone number, e-mail address, and address). The user attribute information may contain information on sex, age, occupation, hobby, hometown, favorite food, favorite artist, and other keywords. For example, the information on other keywords may be arbitrarily set by each user. For example, it may be assumed that the client terminal 10 receives input characters from the user, transmits the input character information to the management server 20, and the updating means of the management server 20 updates the information on other keywords stored in the user database 22 based on the received character information. When the use of the present system is in a membership system, the user information may contain information on whether the user has made member registration. As illustrated in FIG. 3, such user information is stored in association with the user position information. The user position information corresponds to the map information stored in the map database 21, and contains at least information on latitude and longitude.

The user database 22 may store the user information in association with scale condition information therein. In the specification of the present application, the "scale condition information" defines a scale of a map necessary for displaying the user information on the display screen of each client terminal 10. The scale condition information may define that the user information is displayed when the scale of the map is a certain value or more, or conversely may define that the user information is displayed when the scale of the map is a certain value or less. The scale condition information may define that the user information is displayed when the scale of the map is a value in a certain range. For example, in the example illustrated in FIG. 3, the user information with "No. 15" is associated with the scale condition information with "1/1,500 or more." Therefore, there is set such that the user information with "No. 15" is displayed on the map when the scale of the map displayed on the display screen of the client terminal 10 is "1/1,500 or more." On the other hand, the user information with "No. 17" is associated with the scale condition information with "1/150,000 or more." Therefore, there is configured such that the user information with "No. 17" is displayed on the display screen of the client terminal 10 even when the scale of the map indicates a relatively wider range (a smaller scale) than the user information with "No. 15." In this way, each item of user information is associated with the scale condition information so that the maps can be classified into ones to be displayed even when the map indicates a wider range and ones to be displayed when the map is enlarged to indicate a narrower range. For example, when certain user information is desired to be conspicuous, the scale condition information may be set at a scale (small scale) indicating a wider range of the map. The scale condition information associated with each item of user information can be arbitrarily set. For example, the number of times of user's system use is measured, and as the number of times of use is larger, the scale condition information may be defined in a smaller scale. When the use of the system is pay-as-you-go, the user information of a user with a high accounting rate may be associated with the scale condition information on a small scale.

The server receiving means 23 is directed for receiving various items of information transmitted from the client terminals 10 by the management server 20. For example, the server receiving means 23 receives various items of information such as present position information of the client terminal 10 transmitted from the client transmitting means 12, information on the scale of the map information determined by the display scale determining means 16, information on the center of the display range of the map determined by the display center determining means 17, and information on the requested range of the map. The server receiving means 23 can be realized by a network communication device or the like, for example. The network communication device exchanges data with a mobile communication network or general telephone line network via a network such as Internet.

The updating means 24 is directed for updating the user position information stored in the user database 22. That is, as described above, each of the client terminals 10 acquires its present position information by the position information acquiring means 11 and transmits the position information to the management server 20. The position information is transmitted by the client terminal 10 at any timing, periodically, or always. When the management server 20 receives the present position information from the client terminal 10, the updating means 24 updates the user position information stored in the user database 22 based on the received present position information. Therefore, the user position information stored in the user database 22 is always updated to the latest. The users of the present system can grasp other users' present positions in real time. The updating means can appropriately update not only the user position information but also the attribute information, the avatar image and the user ID stored in the user database 22, the scale condition information and the like as needed.

The map reading means 25 is directed for reading map information in a predetermined range from the map database 21. The map reading means 25 may read map information only in a range requested by the client terminal 10 from the map database 21, or may read map information in the range requested by the client terminal 10 and its surrounding range therefrom.

The user information reading means 26 is directed for reading user information meeting a predetermined condition from the user database 22. Specifically, the user information reading means 26 reads the user information associated with the user position information contained in a predetermined range from the user database 22 with reference to the predetermined range of the map information read from the map database 21 by the map reading means 25. At this time, the user information reading means 26 reads the user information and the user position information associated therewith from the user database 22. Further, the user information reading means 26 may read the user information for which the scale condition information stored in the user database 22 corresponds to the display scale information on the basis of the information (display scale information) on the scale of the map information displayed on the displaying means 14 which is determined by the display scale determining means 16 of the client terminal 10 in addition to the above condition. For example, when the scale condition information is defined as "1/8,000 or more" for certain user information in the user database 22, if the scale of the map displayed on the client terminal 10 is "1/1,500", the user information reading means 26 reads the user information. To the contrary, when the scale condition information is defined as "1/8,000 or more" for certain user information in the user database 22, if the scale of the map displayed on the client terminal 10 is "1/150,000", the user information reading means 26 does not read the user information. In this way, the user information reading means 26 determines whether to read the user information depending on the scale of the map displayed on the client terminal 10. The user information and the user position information read by the user information reading means 26 are temporarily stored in the storing means such as memory.

When reading the user information from the user database 22, the user information reading means 26 may determine other users having common user information with the user information of the request user with reference to the user information (particularly attribute information) on the user who requests to acquire the map (which will be also called request user) and the user information (particularly attribute information) on other users. Then, when reading the user information of other users determined as common, the user information reading means 26 preferably flags the user information. For example, in the example of the user database 22 illustrated in FIG. 3, if the user with "No. 15" is a request user, the attribute information of the user information with "No. 15" contains a keyword of "gourmet." The attribute information of the user information with "No. 17" among other users also contains a keyword of "gourmet." Therefore, the user information reading means 26 determines that "No. 17" is a user having the common user information with the request user with "No. 15." Thereafter, the user information reading means 26 flags the user information with "No. 17" when reading the user information with "No. 17" from the user database 22 in response to the map acquiring request from the request user with "No. 15." The management server 20 transmits the thus-flagged user information to the client terminal 10 of the request user. Then, when displaying the flagged user information on the display screen, the client terminal 10 displays it in such a manner that the user can grasp the flagged user information. For example, there may be configured such that the management server 10 reads a flag image from a database (not shown) and transmits it to the client terminal 10 together with the flagged user information, and the flag image is displayed near the avatar image contained in the user information on the display screen of the client terminal 10. The flag image may be stored in the storing means of the client terminal 10, and in this case, when displaying the flagged user information, the client terminal 10 reads the flag image from its storing means, and displays the flag image near the avatar image contained in the user information. In this way, each user can confirm the presence of other users having the common hobby or preference on the map, thereby enhancing a sense of unity in communication. For example, a user updates the user database such that an event name is recorded in the attribute information of the user information on the day when he/she participates in the event. Other users participating in the same event update the user database such that the event name is recorded. In this way, the client terminal of the user displays the user information on other users on the map on the display screen such that the users participating in the same event can be easily seen.

The server transmitting means 27 is directed for transmitting various items of information to the client terminals from the management server 20. For example, the server transmitting means 27 can transmit the user position information and the user information read by the user information reading means 26 to the client terminal 10 together with the map information in a predetermined range read by the map reading means 25. The server transmitting means 27 may transmit contents information and contents position information read by the contents information reading means 29 described later to the client terminal 10. The server transmitting means 27 can be realized by a network communication device, for example, similarly to the server receiving means 23. The network communication device exchanges data with a mobile communication network or general telephone line network via a network such as Internet.

The contents database 28 is directed for storing a plurality of items of contents information. FIG. 4 illustrates exemplary information stored in the contents database 28. The contents information is on different contents from restaurants, amusement facilities, accommodations, related events, texts, and other users' information displayed on the map together with the user information. The contents information may contain a management number (No.) for identifying contents, a name of contents, an icon image briefly indicating the contents, contents (such as advertisement information, contact and text contents), and matching keywords, for example. As illustrated in FIG. 4, each item of contents information is stored in the contents database 28 in association with position information. The contents position information corresponds to the map information stored in the map database 21, and contains at least information on latitude and longitude. The contents position information can be arbitrarily set by a contents provider. The contents information may be associated with a priority display score. The priority display score is referred to by the ranking means 31 described later when a priority order indicating each content is ranked. The priority display score can be set at any value, and for example, a higher priority is set for contents to be intentionally displayed by a service manager or contents to be much charged. The contents information may be associated with information on a display period. The display period defines a period for which the contents information is displayed, and is referred to when the contents information reading means 29 described later reads the contents information. The contents display period may be arbitrarily set.

The contents information may be stored in the contents database 28 in association with the scale condition information. The "scale condition information" is directed for defining a scale of a map required for displaying the contents information on the display screen of each client terminal 10. The scale condition information may define that the contents information is displayed when the scale of the map is a certain value or less, or conversely may define that the contents information is displayed when the scale of the map is a certain value or more. The scale condition information may define that the contents information is displayed when the scale of the map is a value in a certain range. For example, in the example illustrated in FIG. 4, the contents information with "No. 111" is associated with the scale condition information with "1/8,000 or less." Thus, the contents information with "No. 111" is set to be displayed on the map when the scale of the map displayed on the display screen of the client terminal 10 is "1/8,000 or less." For example, a user who is going for an outing views a map with a reduced scale (in a wide display range) in many cases, and thus the scale condition information may be set such that the contents such as famous sightseeing spots can be displayed on the map with a reduced scale. When contents information is registered in the contents database 28 for a fee, the scale condition information with a reduced scale may be associated with the contents information with a high charge.

The contents information reading means 29 is directed for reading the contents information meeting a predetermined condition from the contents database 28. Specifically, the contents information reading means 29 reads the contents information associated with the contents position information contained in a predetermined range from the contents database 28 with reference to the predetermined range of the map information read from the map database 21 by the map reading means 25. At this time, the contents information reading means 29 reads the contents information and the contents position information associated therewith from the contents database 28. Further, the contents information reading means 29 may read the content information for which the scale condition information stored in the contents database 28 corresponds to the display scale information on the basis of the information on the scale of the map information displayed on the displaying means 14 (display scale information) which is determined by the display scale determining means 16 of the client terminal 10 in addition to the above condition. For example, when the scale condition information is defined as "1/8,000 or more" for certain contents information in the contents database 28, if the scale of the map displayed on the client terminal 10 is "1/1,500", the user information reading means 26 reads the user information. In this way, the contents information reading means 29 determines whether to read the contents information depending on the scale of the map displayed on the client terminal 10. The contents information and the contents position information read by the contents information reading means 29 are temporarily stored in the storing means such as memory.

The position shifting means 30 is directed for shifting the position information of the user information read from the user database 22 by the user information reading means 26 by a predetermined value. For example, since the position information is shared among a plurality of users in the information sharing system according to the present invention, when the user of the client terminal 10 uses the service of the present invention at home, his/her home address is known to other users and his/her privacy cannot be protected. Thus, the position shifting means 30 is additionally provided thereby to change the position information of the user information, thereby protecting the privacy of each user. A plurality of defined values for shifting the position information is provided, and it is preferable that the position shifting means 30 randomly selects one defined value from the defined values and shifts the position information of the user information based on the selected defined value. If the defined value for shifting the position information is constant, the position information prior to being shifted can be calculated by back calculation from the shifted position information, and one of the defined values is randomly selected in this manner, thereby to solve such a problem.

The position shifting means 30 may determine whether the position information of the user information read from the user database 22 by the user information reading means 26 matches with the position information of the contents information read from the contents database 28 by the contents information reading means 29 or is contained in a certain range about the position information of the contents information. Only when it is determined that the position information of the user information does not match with the position information of the contents information or is not contained in a certain range about the position information of the contents information, the position shifting means 30 may shift the position information of the user information based on a predetermined value. That is, when it is determined that the position information of the user information matches with the position information of the contents information or is contained in a certain range about the position information of the contents information, the position shifting means 30 does not shift the position information of the user information. The certain range herein may be set at a radius of 5 m to 500 m, a radius of 10 to 300, or a radius of 20 m to 100 m, for example. For example, when the position information of the user information matches with the position information of the contents information, the user can be determined as being at a contents providing place (such as restaurant or amusement facility), and thus the need for shifting the position information in order to protect the user's privacy is not so much. Only when the user is at a contents providing place, the position information of the user information is not shifted so that other users can accurately grasp that the user is at the contents providing place, thereby promoting other users to visit the contents providing place. Thereby, the potential of the advertisement contents is enhanced.

The ranking means 31 is directed for ranking the user information read by the user information reading means 26 and the contents information read by the contents information reading means 29 in order to sort them based on a preset priority. For example, the ranking means 31 may rank the user information and the contents information in a range (area) of the map information requested by the client terminal 10. For example, for the user information, preferably the attribute information is preferentially sorted, and a high priority is given to the users having a membership. It is preferable that a high priority is given as the time when the user's present position is updated is closer to the present time (the time when the ranking is performed). For the contents information, the ranking may be performed based on the priority display score value stored in the contents database 28. When the priority display score values are equal, a higher priority is given to the contents defined at a smaller scale by the scale condition information (displayed on the map in a wider range).

There may be configured such that the ranking means 31 extracts the attribute information (see FIG. 2) with reference to the user database 22 for the user who requests to acquire the map, inquires the matching keywords stored in the contents database 28 based on the extracted attribute information, and gives a higher priority to a matching keyword having a higher degree of similarity between the user's attribute information and the contents information. For example, by way of the examples illustrated in FIGS. 2 and 3, the user database 22 (FIG. 2) stores therein the attribute information of "female, age of 24, office worker, apparel, gourmet, Italian" for the user information with "No. 017." Therefore, when the user with "No. 017" requests the management server 20 to acquire the map, the contents information with "No. 111" whose matching keywords are set as "Italian, gourmet, for females, office worker" has more matched items than "No. 112" with reference to the contents database 28 (FIG. 3), and is given a higher priority. Then, the ranking means 31 forms the ranking of the user information and the contents information according to the thus-calculated priority.

The higher extracting means 32 is directed for extracting, in a descending order, a preset desired number of items of user information and contents information according to the priority order ranked by the ranking means 31 from among a plurality of items of user information read by the user information reading means 26 and a plurality of items of contents information read by the contents information reading means 29. For example, the upper limits of the user information and the contents information to be extracted in a descending order may be arbitrarily set by the user or may be defined by a service manager. For example, it is preferable that the total number of items requested by the user is multiplied by the previously-designated ratio between the user information and the contents information thereby to calculate the specific upper limits of the user information and the contents information to be contained in each area. Thereafter, the higher extracting means 32 extracts the user information and the contents information in a descending order below the respective calculated upper limits according to the ranking order by the ranking means 31.

Subsequently, a flow of an information sharing method performed by the information sharing system 100 having the above functional structure will be described. FIG. 5 is a flowchart illustrating a flow of the information processing performed by the information sharing system 100.

As illustrated in FIG. 5, at first, the user activates the application program stored in the client terminal 10, and checks in for starting to use the system (step S1). For example, an icon for check-in is displayed by the displaying means 14 of the client terminal 10, and the user selects the icon. For example, on check-in, the client terminal 10 may request the user to input the user ID and the password.

When check-in is made, the client terminal 10 acquires the present position information of the client terminal 10 by the position information acquiring means 11 (step S2). The client terminal 10 stores and temporarily holds time/date when it acquires the position information in the memory or the like together with the present position information acquired by the position information acquiring means 11.

Thereafter, the client terminal 10 transmits the present position information acquired by the position information acquiring means 11 and the acquisition time/date information to the management server 20 via the client transmitting means 12 (step S3). At this time, the client terminal 10 may transmit the user-input user ID and password to the management server 20, and may inquire whether the user is registered as a membership for the service use.

Subsequently, the management server 20 receives the present position information and its acquisition time/date information transmitted from the client terminals 10 via the server receiving means 23 (step S4). As illustrated in FIG. 5, the client terminal 10 performs the check-in (S1) to the position information transmission (S3) processing, and other client terminals 10 perform the check-in (S1') to the position information transmission (S3') processing. The management server 20 can receive the present position information and its acquisition time/date information transmitted from all the client terminals 10.

Thereafter, the management server 20 updates the user position information stored in the user database 22 based on the present position information received from the client terminals 10 (step S5). As described above, the user database 22 stores the user information and the position information per user in an associated manner. The management server 20 specifies which user the position information transmitted from the client terminals 10 is for based on the user ID and the password, and updates the position information of the specified user.

Thereafter, the management server 20 reads the map information around the present position of the client terminal 10 from the map database 21 by the map reading means 25 (step S6). The map information has the map data with different scales in a hierarchy, but the scale of the map information to be first read may be previously defined.

Thereafter, the management server 20 transmits the map information read by the map reading means 25 to the client terminal 10 via the server transmitting means 27 (step S7).

Subsequently, the client terminal 10 receives the map information transmitted by the management server 20 via the client receiving means 13 (step S8). The received map information is stored and temporarily held in the memory or the like of the client terminal 10.

Thereafter, the client terminal 10 displays the map information in a predetermined range received from the management server 20 by the displaying means 14 (step S9). When the map information is displayed, the client terminal 10 receives an operation of changing the display range of the map or the scale of the map by the operating means 15. For example, at the initial stage, the displaying means 14 of the client terminal 10 displays thereon the map around the present position of the client terminal 10 in a predetermined scale. The user views the map, and when the range of the map is different from the range in which the user wants to collect information, the user can input an operation of changing to the desired display range and scale via the operating means 15. On the other hand, when the user views the first-displayed map and thinks that the range of the map matches with the range in which he/she wants to collect information, he/she does not need to operate the map particularly.

When the map is displayed on the displaying means 14, the client terminal 10 determines the center position on the display screen by the display center determining means 17 (step S10). The display center determining means 17 always acquires latitude and longitude of the center point of the map displayed on the displaying means 14, and stores it in the storing means such as memory as needed.

When the map is displayed on the displaying means 14, the client terminal 10 determines the scale of the displayed map by the display scale determining means 16 (step S11). The display scale determining means 16 always acquires the scale of the map displayed on the displaying means 14, and stores it in the storing means such as memory as needed.

Thereafter, the client terminal 10 determines the range of the map for which it requests the management server 20 to redistribute the map information, to distribute the user information and to distribute the contents information on the basis of the center position of the displayed area of the map determined by the display center determining means 17 and the scale of the map determined by the display scale determining means 16 (step S13). The client terminal 10 may define a unique area having a certain area, and its area ID at any position on the map and at any scale by the application program, for example. In this case, the client terminal 10 may determine the area and area ID based on the scale of the map information and the center of the displayed range, and may request the map information in a range containing the area, the user information and the contents information to the management server 20.

Thereafter, the client terminal 10 transmits latitude and longitude of the center position of the map determined in step S10, the information on the scale of the map information determined in step S11 (display scale information), and the information on the range of the map to be requested determined in step S12 to the management server 20 via the client transmitting means 12 (step S13).

Subsequently, the management server 20 receives various items of information transmitted from the client terminal 10 via the server receiving means 23 in step S13 (step S14).

Thereafter, the management server 20 reads the map information in the range requested by the client terminal 10 from the map database 21 via the map reading means 25 (step S15).

The user information reading means 26 of the management server 20 reads the user information meeting a predetermined condition from the user database 22 (step S16). Specifically, the user information reading means 26 basically reads a plurality of items of user information the user position information of which is contained in the predetermined range of the map information from the user database 22 based on the predetermined range of the map information read by the map reading means 25. Further, in addition to the condition, the user information reading means 26 preferably reads the user information for which the scale condition information stored in the user database 22 corresponds to the display scale information on the basis of the information on the scale of the map displayed on the client terminal 10 (display scale information). In this way, the user information reading means 26 determines the user information to be read from the user database 22 on the basis of the range and scale of the map displayed on the client terminal 10. The user information reading means 26 reads the user information and the user position information associated therewith from the user database 22.

Further, in step S16, when reading the user information from the user database 22, the user information reading means 26 may determine other users having the common user information with the user information of the request user with reference to the user information (particularly attribute information) on the user (request user) who requests to acquire the map, and the user information (particularly attribute information) on other users. Then, when reading the user information on other users determined as common, the user information reading means 26 preferably flags the user information. For example, in the example of the user database 22 illustrated in FIG. 3, if the user with "No. 15" is a request user, the attribute information on the user information with "No. 15" contains a keyword of "gourmet." The attribute information of the user information with "No. 17" among other users also contains a keyword of "gourmet." Therefore, the user information reading means 26 determines that "No. 17" is a user having the common user information with the request user with "No. 15." Thereafter, the user information reading means 26 flags the user information with "No. 17" when reading the user information with "No. 17" from the user database 22 in response to the map acquiring request from the request user with "No. 15."

Thereafter, the position shifting means 30 of the management server 20 shifts the position information of the user information read from the user database 22 by the user information reading means 26 by a predetermined value (step S17). For example, a plurality of defined values is provided for shifting the position information, and it is preferable that the position shifting means 30 randomly selects one defined value from among the provided defined values, and shifts the position information of the user information based on the selected defined value. In step S17, the position shifting means 30 may determine whether the position information of the user information read from the user database 22 by the user information reading means 26 matches with the position information of the contents information read from the contents database 28 by the contents information reading means 29 or is contained in a certain range about the position information of the contents information. Then, only when it is determined that the position information of the user information does not match with the position information of the contents information or is not contained in a certain range about the position information of the contents information, the position shifting means 30 may shift the position information of the user information based on the predetermined value.

Then, the contents reading means 29 of the management server 20 reads the contents information meeting a predetermined condition from the contents database 28 (step S18). Basically, the contents information reading means 29 reads a plurality of items of contents information for which the contents position information is contained in a predetermined range of the map information from the contents database 28 based on the predetermined range of the map information read by the map reading means 25. Further, in addition to the condition, the contents information reading means 29 reads the contents information for which the scale condition information stored in the contents database 28 corresponds to the display scale information based on the information on the scale of the map displayed on the client terminal 10 (display scale information). Further, in addition to the above condition, it is preferable that the contents information reading means 29 matches the time/date when the contents information is requested to distribute with the display period in which the information is stored in the content database 28, and extracts only the contents information for which the time/date when the request is made is contained in the display period. The contents information reading means 29 reads the contents information and the contents position information associated therewith from the contents database 28.

Subsequently, the management server 20 ranks a plurality of items of user information and a plurality of items of contents information read from various databases in step S16 and step S18 by the ranking means 31 (step S19). When ranking the items of user information, the ranking means 31 may rank the same based on the attribute information stored in the user database 22 or the time when the present position information is updated. When ranking the items of contents information, the ranking means 31 may rank the same based on the priority display score stored in the contents database 28, or the scale condition information. The ranking means 31 may compare the attribute information contained in the user information with the matching keywords stored in the contents database 28 and give a priority to some items of contents information.

The management server 20 extracts, in a descending order, a preset desired number of items of user information and contents information according to the priority order ranked by the ranking means 31 from among the items of user information and the items of contents information read from various databases in step S16 and step S18 by the higher extracting means 32 (step S20). For example, the upper limits of items of user information and contents information to be extracted in a descending order may be arbitrarily set by the user or may be defined by a service manager. The higher extracting means 32 extracts the user information and the contents information in a descending order below the respective calculated upper limits according to the ranking order by the ranking means 31.

Then, the management server 20 transmits the map information read in step S15, the items of user information and their position information extracted by the higher extracting means 32, and the items of contents information and their position information to the request client terminal 10 via the server transmitting means 27 (step S21). When flagging the user information in step S16, the server transmitting means 27 transmits the flagged user information to the client terminals 10.

Subsequently, the client terminal 10 receives the map information, the items of user information and their position information, and the items of contents information and their position information transmitted from the management server 20 by the client receiving means 13 (step S22). The client terminal 10 temporarily stores various items of received information in the memory or the like.

Thereafter, the displaying means 14 of the client terminal 10 displays the items of user information and the items of contents information at respective positions corresponding to the respective items of position information on the map in the predetermined range received in step S22 (step S23). The items of user information each contain a user's avatar image, and the items of contents information each contain an icon. Thus, the displaying means 14 can display the user's avatar images and the contents icon images at the positions corresponding to the respective items of position information with reference to latitude and longitude on the map.

When acquiring the flagged user information in step S16, the client terminal 10 preferably displays the flag image near the avatar image when displaying the avatar image contained in the flagged user information by the displaying means 14. For example, the flag image is stored in the storing means of the client terminal 10, and when displaying the flagged user information, the client terminal 10 reads the flag image from its storing means and displays the flag image near the avatar image contained in the user information. The flag image may be stored in the database of the management server 10, and in this case, the management server 10 may read the flag image from the database when transmitting the flagged user information to the client terminal 10, and may provide the same to the client terminal 10.

Figure 6:
FIG. 6 illustrates an exemplary screen displayed on a client terminal according to the embodiment of the present invention.

FIG. 6 illustrates an exemplary screen displayed by the displaying means 14. In FIG. 6, the reference U indicates a user's avatar image and the reference C indicates a contents icon image. As illustrated in FIG. 6, with the information sharing system according to the present invention, the items of user information (avatar images U) and the items of contents information (icon images C) can be displayed in a position relationship closer to the actual locations in the real world in a certain range of the map. For example, the user of the client terminal 10 can confirm other users close to his/her present position or confirm the contents close to his/her present position on viewing the display screen. On viewing the display screen, the user can confirm at which contents other users are gathering and which contents are popular. In this way, with the information sharing system according to the present invention, mutual position information or information on an area can be shared among a plurality of users, thereby creating new communication with a sense of unity and solidarity. When the flag image is displayed near the avatar image, the flag image may be well known, and may employ various images such as star shape, heart shape, character shape, symbols, numerals, characters.

Thereafter, the processing returns to step S9, where the client terminal 10 receives an operation of changing the display range or scale of the map from the user via the operating means 15. The information sharing system 100 repeatedly performs the loop from step S6 to step S23 while the map is being displayed on the client terminal 10.

The preferred embodiment of the present invention has been mainly described above in the specification with reference to the drawings in order to express the contents of the present invention. The present invention is not limited to the above embodiment, and may encompass modifications or improvements understood by those skilled in the art based on the description in the specification.

INDUSTRIAL APPLICABILITY

The present invention relates to an information sharing system constructed by a server/client system. Thus, the present invention can be suitably used in the field of information techniques.

REFERENCE SIGNS LIST

10: Client terminal
11: Position information acquiring means
12: Client transmitting means
13: Client receiving means
14: Displaying means
15: Operating means
16: Display scale determining means
17: Display center determining means
20: Management server
21: Map database
22: User database
23: Server receiving means
24: Updating means
25: Map reading means
26: User information reading means
27: Server transmitting means
28: Contents database
29: Contents information reading means
30: Position shifting means
31: Ranking means
32: Higher extracting means

The invention claimed is:

1. An information sharing system in which a plurality of client terminals and a management server are communicably connected to each other via an information communication line,
wherein each of the client terminals comprises:
a position information acquirer that acquires its present position information; and
a client transmitter that transmits the present position information acquired by the position information acquirer, to the management server,
the management server comprises:
a map database that stores map information with a plurality of scales;
a user database that stores user information on the users of the client terminals, user position information on a map stored in the map database, and scale condition information on a scale of map information required for displaying the user information in an associated manner;
a server receiver that receives the present position information transmitted from the client transmitter;
an updater that updates the user position information stored in the user database based on the present position information received by the server receiver;
a map reader that reads the map information in a predetermined range from the map database;
a user information reader that reads the user position information contained in the predetermined range and the user information associated with the user position information contained in the predetermined range from the user database on the basis of the predetermined range of the map information read by the map reader; and
a server transmitter that transmits the user position information and the user information read by the user information reader, to the client terminals together with the map information in the predetermined range read by the map reader,
each of the client terminals further comprises:
a client receiver that receives the map information in the predetermined range, the user position information and the user information transmitted from the server transmitter;
a display that displays the user information at respective positions corresponding to the user position information on the map information in the predetermined range received by the client receiver;
an operating device that changes a scale of the map information and a display range of the map information displayed on the display;
a display scale determiner that determines the scale of the map information displayed on the display; and
a display center determiner that determines the display range of the map information displayed on the display,
display scale information on the scale of the map information determined by the display scale determiner and display range information on the display range of the map information determined by the display center determiner are transmitted by the client transmitter and are received by the server receiver,
the map reader reads the map information in a predetermined range corresponding to the display range information received by the server receiver from the map database, and
the user information reader reads, from the user database, the user information for which the user position information is contained in the predetermined range of the map information corresponding to the display range information and the scale condition information corresponds to the display scale information, on the basis of the predetermined range of the map information corresponding to the display range information read by the map reader and the display scale information received by the server receiver.

2. The information sharing system according to claim 1, wherein the management server further comprises:
a contents database that stores contents information including images in association with contents position information on the map stored in the map database and scale condition information on the scale of map information required for displaying the contents information; and
a contents information reader that reads, from the contents database, the contents information for which the contents position information is contained in the predetermined range of map information corresponding to the display range information and the scale condition information corresponds to the display scale information, on the basis of the predetermined range of the map information corresponding to the display range information read by the map reader and the display scale information received by the server receiver,
the contents information read by the contents information reader is transmitted by the server transmitter together with the contents position information, and is received by the client receiver, and
the display of the client terminal displays images contained in the contents information at respective positions corresponding to the contents position information on the map information in the predetermined range corresponding to the display range information received by the client receiver.

3. The information sharing system according to claim 1, wherein the management server further comprises:
a position shifter that shifts, by a predetermined value, the user position information read from the user database by the user information reader.

4. The information sharing system according to claim 2, wherein the management server further comprises:
a position shifter that shifts, by a predetermined value, the user position information read from the user database by the user information reader, and
the position shifter determines whether the user position information read from the user database by the user information reader matches the contents position information read from the contents database by the contents information reader or is contained in a predetermined range about the contents position information, and if the user position information does not match the contents position information or is not contained in the predetermined range about the contents position information, shifts the user position information by the predetermined value.

5. A non-transitory computer readable recording medium storing a computer program for causing a portable information communication terminal to function as one of the client terminals in the information sharing system according to claim 1.

6. An information sharing method performed by a system in which a plurality of client terminals and a management server are communicably connected to each other via an information communication line, wherein each of the client terminals performs:
acquiring its present position information;
changing a scale of map information displayed on a display and a display range of the map information;
determining the scale of the map information displayed on the display;
determining the display range of the map information displayed on the display; and
transmitting, to the management server, the present position information acquired in the present position information acquiring, display scale information on the scale of the map information determined in the display scale determining, and display range information on the display range of the map information determined in the display range determining, the management server comprises:
a map database that stores map information with a plurality of scales; and
a user database that stores user information on the users of the client terminals, user position information on a map stored in the map database and scale condition information on a scale of map information required for displaying the user information in an associated manner, the management server performs:
receiving the present position information, the display scale information and the display range information transmitted in the transmitting by the client terminal;
updating the user position information stored in the user database based on the present position information received in the receiving by the management server;
reading the map information in a predetermined range corresponding to the display range information from the map database;
reading, from the user database, the user position information contained in the predetermined range corresponding to the display range information, on the basis of the predetermined range of the map information corresponding to the display range information read in the map information reading, and reading user information which is associated with the read user position information and for which the scale condition information corresponds to the display scale information on the basis of the display scale information received in the receiving by the management server; and
transmitting, to the client terminals, the user position information and the user information read in the user information reading, together with the map information in the predetermined range corresponding to the display range information read in the map information reading, and each of the client terminals further performs:
receiving the map information in the predetermined range, the user position information and the user information transmitted in the transmitting by the management server; and
displaying the user information at respective positions corresponding to the user position information on the map information in the predetermined range received in the receiving by the client terminal.

7. The information sharing system according to claim 2, wherein the management server further comprises:
a position shifter that shifts, by a predetermined value, the user position information read from the user database by the user information reader.

* * * * *